(12) United States Patent
Sharma et al.

(10) Patent No.: US 11,086,767 B2
(45) Date of Patent: *Aug. 10, 2021

(54) INTELLIGENT GENERATION OF LOG MESSAGES BY A SAAS OFFERING IN A CONTINUOUS PIPELINE

(71) Applicant: International Business Machines Corporation, Armonk, NY (US)

(72) Inventors: Kalpesh Sharma, Bangalore (IN); Mahantesh Meti, Bangalore (IN); Albee Jhoney, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 22 days.

This patent is subject to a terminal disclaimer.

(21) Appl. No.: 16/750,101

(22) Filed: Jan. 23, 2020

(65) Prior Publication Data

US 2020/0159652 A1 May 21, 2020

Related U.S. Application Data

(63) Continuation of application No. 15/924,827, filed on Mar. 19, 2018, now Pat. No. 10,585,789.

(51) Int. Cl.
*G06F 11/36* (2006.01)
(52) U.S. Cl.
CPC ...... *G06F 11/3692* (2013.01); *G06F 11/3676* (2013.01); *G06F 11/3688* (2013.01)
(58) Field of Classification Search
None
See application file for complete search history.

(56) References Cited

U.S. PATENT DOCUMENTS

| 6,574,792 | B1 | 6/2003 | Easton |
| 8,732,530 | B2 | 5/2014 | Ng |
| 9,342,438 | B2 | 5/2016 | Han |
| 9,569,328 | B2 | 2/2017 | Pavlov et al. |
| 2008/0148239 | A1 | 6/2008 | Petrov et al. |
| 2019/0286552 | A1 | 9/2019 | Sharma et al. |

OTHER PUBLICATIONS

Office Action (dated Jul. 5, 2019) for U.S. Appl. No. 15/924,827, filed Mar. 19, 2018.
Amendment (dated Oct. 7, 2019) for U.S. Appl. No. 15/924,827, filed Mar. 19, 2018.
Notice of Allowance (dated Oct. 24, 2019) for U.S. Appl. No. 15/924,827, filed Mar. 19, 2018.

*Primary Examiner* — Qing Chen
(74) *Attorney, Agent, or Firm* — Schmeiser, Olsen & Watts, LLP; Nicholas L. Cadmus

(57) ABSTRACT

An adaptive log system and method may include calculating a complexity of the change set, comparing a current log message with a previous log message created as a result of the test operation during a previous run, to determine a log difference between the current log message and the previous log message, determining a module sensitivity for each module of the change set, identifying a trust level of a developer of the change set, dynamically adjusting log level settings, and analyzing a serviceability of the change set made to the continuous delivery pipeline based on: (i) the complexity of the change set, (ii) the log difference, (iii) the module sensitivity of each module of the change set, and (iv) the trust level of the developer, wherein, as a function of the analyzing, the sufficiency of log messages for each module of the change set is determined.

20 Claims, 11 Drawing Sheets

INTELLIGENT GENERATION OF LOG MESSAGES BY A SAAS OFFERING IN A CONTINUOUS PIPELINE

This application is a continuation application claiming priority to Ser. No. 15/924,827 (now U.S. Pat. No. 10,585,789), filed Mar. 19, 2018.

TECHNICAL FIELD

The present invention relates to systems and methods for log message generation, and more specifically the embodiments of an adaptive log system for providing feedback to developers of a sufficiency of log messages associated with the changes made to computer program (or source code) of a SaaS product delivered using a continuous delivery pipeline in a SaaS environment.

BACKGROUND

DevOps teams for SaaS environments continuously deliver new features at a rapid pace. A continuous delivery process and tool enables DevOps engineers to continuously fix defects and release new features to staging and eventually to production. The SaaS operation team needs to be in-sync with the changes that are being introduced in the DevOps pipeline, so that the SaaS operation team can closely monitor the system for any new defect, rapidly isolate problems and resolve the problems with the help from a Development engineer. For instance, SaaS Operations engineers typically depend on log messages generated by the SaaS environment to isolate and resolve issues.

SUMMARY

An aspect of this invention relates to a method, computer system, and computer program product for providing feedback to developers of a sufficiency of log messages associated with a change set made to computer program (or source code) of a SaaS product delivered using a continuous delivery pipeline in a SaaS environment. A processor of a computing system calculates a complexity of the change set made to the SaaS product. A current sequence of log messages created as a result of a test operation of the continuous delivery pipeline during a current run is compared with a previous sequence of log messages created as a result of the test operation during a previous run, to determine changes in the log message or existence of new log messages in the source code. A module sensitivity for each module of the change set is determined. A trust level of a developer of the change set is identified. A serviceability of the change set made to the continuous delivery pipeline is analyzed based on: (i) the complexity of the change set, (ii) the log difference, (iii) the module sensitivity of each module of the change set, and (iv) the trust level of the developer, wherein, as a function of the analyzing, the sufficiency of log messages for each module of the change set is determined.

DETAILED DESCRIPTION

Figure 1:
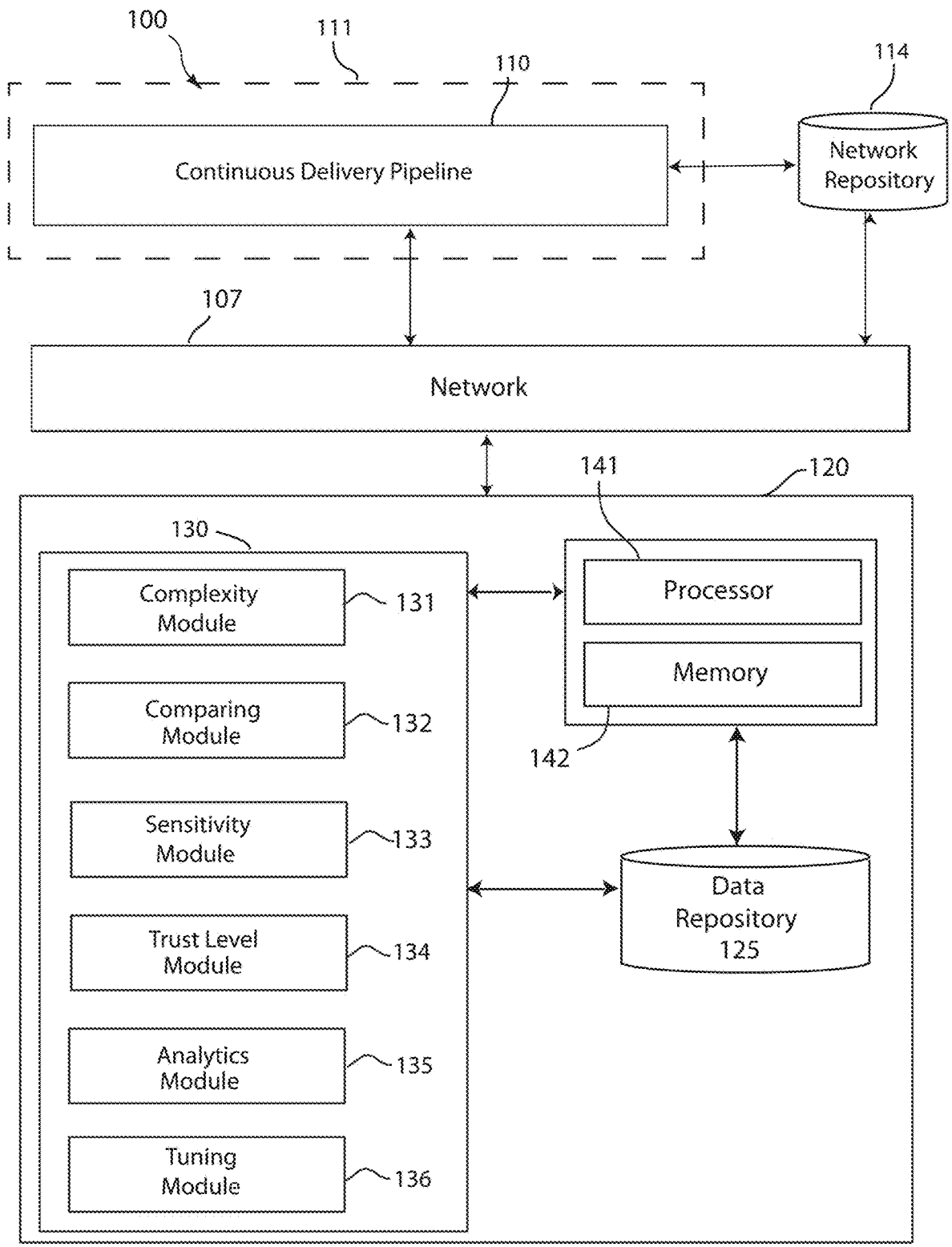
FIG. 1 depicts a block diagram of an adaptive log system, in accordance with embodiments of the present invention.

A SaaS operation team must be in-sync with the changes that are being introduced in the DevOps pipeline, so that the SaaS operation team can closely monitor the system for any new defect, rapidly isolate problems and resolve the problems, with help from a development team member. A SaaS Operations engineer is typically dependent on logs generated by the SaaS environment (e.g. application/infrastructure) to isolate & resolve issues. The SaaS Operations team can adjust log level settings (e.g. Debug, Info, Trace, Error, Warning, etc.) based on a risk perception and trade-off with an overall performance of the SaaS application. However, the SaaS Operations engineer can be faced with a limitation of discretely and manually tuning a logging system to emit logs from the different modules of the SaaS system. In addition, the SaaS Operations team may be expected to follow the long drawn change management process to introduce changes in the production system. When the SaaS Development and Operations team (DevOps) are out-of-sync, the DevOps team can be faced with insufficient logs from the SaaS environment to debug a problem. Thus, there is a need to configure the logging system to optimally emit logs, and for the DevOps team to be in-sync with the changes being introduced in the continuous delivery pipeline, through sufficient log messages created in the SaaS environment. In addition, the adaptive log system can dynamically control the nature of (or, class of) log message generated by the individual internal module of a running SaaS product, based on the stability of the changes that were recently introduced into the SaaS product.

Embodiments of the present invention may relate to a method, computer system, and computer program that can dynamically control the class of log message generated by the individual internal modules of a running SaaS product, based on the changes that were recently introduced into the SaaS product. Wherein, the log message is typically classified as fatal, error, major, minor, info or debug; and the log level settings determine the class of log messages that will be emitted by the internal components of the SaaS product. The log message generation is dynamically controlled based on the stability of recent change made to the SaaS product. The change-stability is computed for all the modules of the SaaS product, based on i) the complexity and recency of the change set, wherein the complexity of change set can influence adjusting log level settings based on severity/priority of the defect, number of files changed, result of static code analysis, code coverage analysis, KLOC delivered as a part of change etc., (ii) the module sensitivity of each module of the change set, wherein the module sensitivity can also influence adjusting log level settings based on a percentage of high severity defects addressed in that module/file, historical information about the frequency of changes made in this module/file, type of file and how many times regressions reported again the same module/file etc.; (iii) the trust level of the developer, wherein the trust level of the DevOps person can be measured based on complexity handled, problems reported from the field related to the changes delivered, time spent in the same project, quality of the code delivered, critical defects fixed, defects re-opened etc.; and/or (iv) the number of problems reported by the users against the module of SaaS product, and the age of the problem, also affects the risk of failure in all the modules of the SaaS product. The change-stability computation function uses all these parameters and periodically computes the change-stability factor. The change-stability factor is used to dynamically determine the log level settings for the modules of the SaaS product.

Referring to the drawings, FIG. 1 depicts a block diagram of an adaptive log system 100, in accordance with embodiments of the present invention. Embodiments of the adaptive log system 100 may be a system for providing feedback to developers of a sufficiency of log messages associated with a change set made to a continuous delivery pipeline in a SaaS environment 111. Embodiments of the adaptive log system 100 may be useful for SaaS DevOps teams for improving defects, problems, issues, etc. that may occur within the SaaS environment 111. For example, the adaptive log system 100 may intelligently provide feedback to a development SaaS team member about insufficient log messages for changes introduced into the SaaS offerings based on a change complexity and a module sensitivity of a change set. Further, embodiments of the adaptive log system 100 may dynamically set a log level based on prior problems and defects, change complexity, and module sensitivity to ensure sufficient logs for highly sensitive changes. Embodiments of the adaptive log system 100 may continuously change the log level setting based on the continuous learning from the field (e.g. new problems occurring in the continuous delivery pipeline) to ensure sufficient logs to support further problem determination.

Embodiments of the adaptive log system 100 may be an adaptive log controller system, a log message system, a log message serviceability determination system, a SaaS quality control system, a dynamic log level system, a log level tuning system, and the like. Embodiments of the adaptive log system 100 may include a computing system 120. Embodiments of the computing system 120 may be a computer system, a computer, a server, one or more servers, an adaptive log controller, and the like.

Furthermore, embodiments of adaptive log system 100 may include a continuous delivery pipeline 110 of a SaaS environment 111 that is communicatively coupled to a computing system 120 of the adaptive log system 100 over a computer network 107. For instance, information/data may be transmitted to and/or received from the continuous delivery pipeline 110 over a network 107. A network 107 may be the cloud. Further embodiments of network 107 may refer to a group of two or more computer systems linked together. Network 107 may be any type of computer network known by individuals skilled in the art. Examples of network 107 may include a LAN, WAN, campus area networks (CAN), home area networks (HAN), metropolitan area networks (MAN), an enterprise network, cloud computing network (either physical or virtual) e.g. the Internet, a cellular communication network such as GSM or CDMA network or a mobile communications data network. The architecture of the network 107 may be a peer-to-peer network in some embodiments, wherein in other embodiments, the network 107 may be organized as a client/server architecture.

In some embodiments, the network 107 may further comprise, in addition to the computing system 120, a connection to one or more network-accessible knowledge bases 114, which are network repositories containing SaaS environment data, network repositories or other systems connected to the network 107 that may be considered nodes of the network 107. In some embodiments, where the computing system 120 or network repositories allocate resources to be used by the other nodes of the computer network 107, the computing system 120 and network-accessible knowledge bases 114 may be referred to as servers.

The network-accessible knowledge bases 114 may be a data collection area on the computer network 107 which may back up and save all the data transmitted back and forth between the nodes of the computer network 107. For example, the network repository may be a data center saving and cataloging SaaS development and operations data, to generate both historical and predictive reports regarding a particular SaaS environment. In some embodiments, a data collection center housing the network-accessible knowledge bases 114 may include an analytic module capable of analyzing each piece of data being stored by the network-accessible knowledge bases 114. Further, the computing system 120 may be integrated with or as a part of the data collection center housing the network-accessible knowledge bases 114. In some alternative embodiments, the network-accessible knowledge bases 114 may be a local repository that is connected to the computing system 120.

Figure 2:
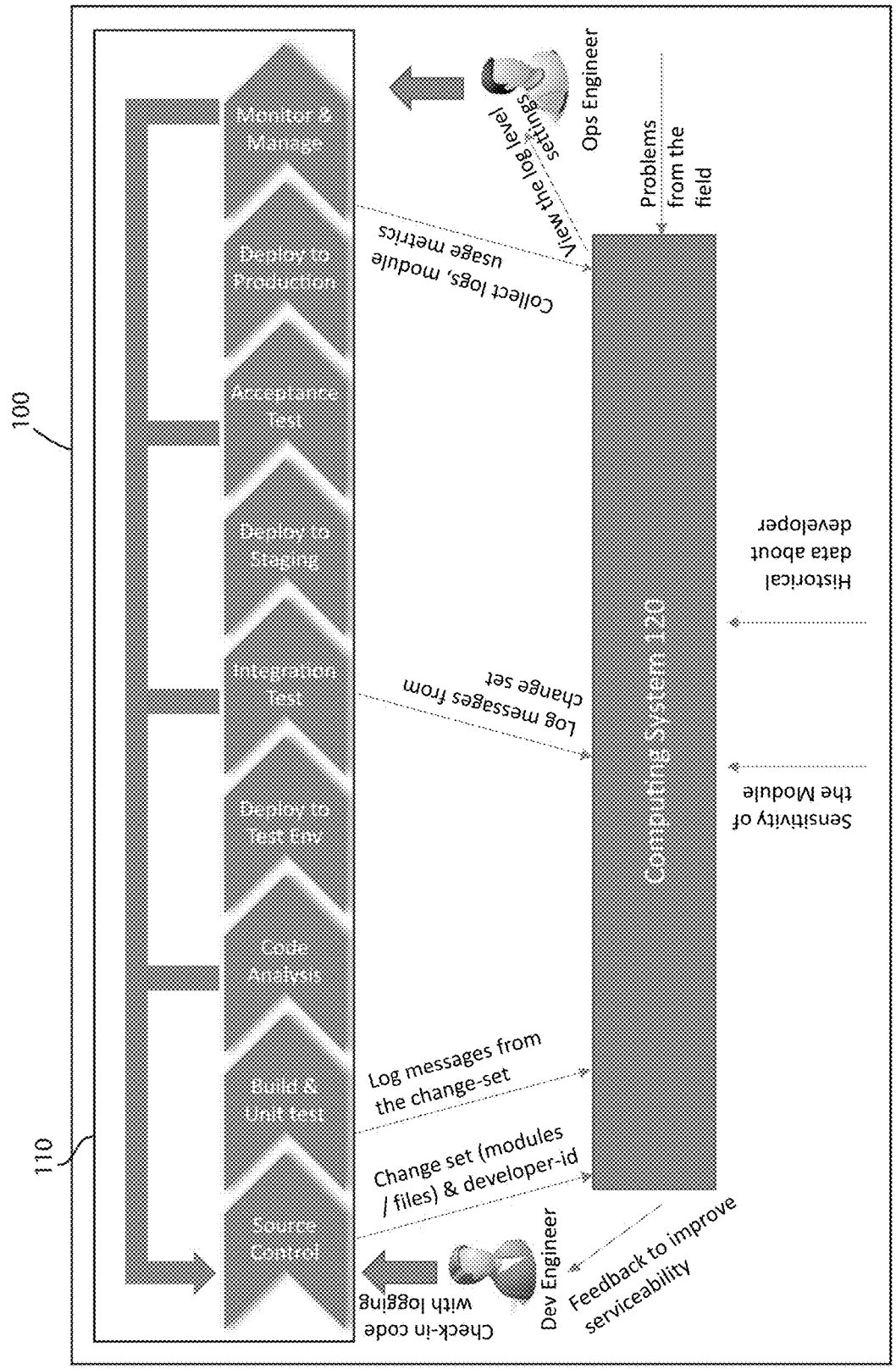
FIG. 2 depicts a schematic view of the adaptive log system, with a continuous delivery pipeline and a computing system, in accordance with embodiments of the present invention.

FIG. 2 depicts a schematic view of the adaptive log system 100, with a continuous delivery pipeline 110 and a computing system 120, in accordance with embodiments of the present invention. Embodiments of the continuous delivery pipeline 110 may be a continuous delivery pipeline, a continuous integration and continuous delivery pipeline, a deployment pipeline, a pipeline that automatically tests and deploys software code as part of a SaaS application/infrastructure, and the like. Embodiments of the pipeline 110 may include aspects of a SaaS development team/engineer and a SaaS operations team/engineer. The pipeline 110 may flow in both directions, and may include a plurality of components. For example, the pipeline 110 may include a source control component, a build and test component, a code analysis component, a deploy to test environment component, an integration test component, a deploy to staging component, an acceptance test component, a deploy to production component, and a monitor and manage component. Other embodiments of pipeline 110 may include additional components, or may include less components than shown in FIG. 2. At various point in the continuous delivery pipeline, information/data may be communicated to the computing system 120. As described in greater detail infra, the computing system 120 may receive data associated with the change set, modules and files information of the change set, developer identification information, log messages from the change set or regarding the change set, usage metrics, and the like. The computing system 120 may then provide feedback to a SaaS development team to improve serviceability of one or more logs created during test operations of the pipeline 110, as well as dynamically configure log level settings that may be tuned or otherwise filtered by the SaaS operations teams when addressing problems associate with the SaaS environment 111. Accordingly, the pipeline 110 may transmit, initiate, create, send, etc. (e.g. over a network 107) discrete data inputs and information to computing system 120. Embodiments of the device 110 may connect to the computing system 120 over network 107. The pipeline 110 may be running one or more software applications and tools communicating with computing system 120.

Referring back to FIG. 1, embodiments of the computing system 120 may be equipped with a memory device 142 which may store various data/information/code, and a processor 141 for implementing the tasks associated with the adaptive log system 100. In some embodiments, an adaptive log application 130 may be loaded in the memory device 142 of the computing system 120. The computing system 120 may further include an operating system, which can be a computer program for controlling an operation of the computing system 120, wherein applications loaded onto the computing system 120 may run on top of the operating system to provide various functions. Furthermore, embodiments of computing system 120 may include the adaptive log application 130. Embodiments of the adaptive log application 130 may be an interface, an application, a program, a module, or a combination of modules. In an exemplary embodiment, the adaptive log application 130 may be a software application running on one or more back end servers, such as computing system 120.

The adaptive log application 130 of the computing system 120 may include a complexity module 131, a comparing module 132, a sensitivity module 133, a trust level module 134, an analytics module 135, and a tuning module 136. A "module" may refer to a hardware-based module, software-based module or a module may be a combination of hardware and software. Embodiments of hardware-based modules may include self-contained components such as chipsets, specialized circuitry and one or more memory devices, while a software-based module may be part of a program code or linked to the program code containing specific programmed instructions, which may be loaded in the memory device of the computing system 120. A module (whether hardware, software, or a combination thereof) may be designed to implement or execute one or more particular functions or routines.

Figure 3:
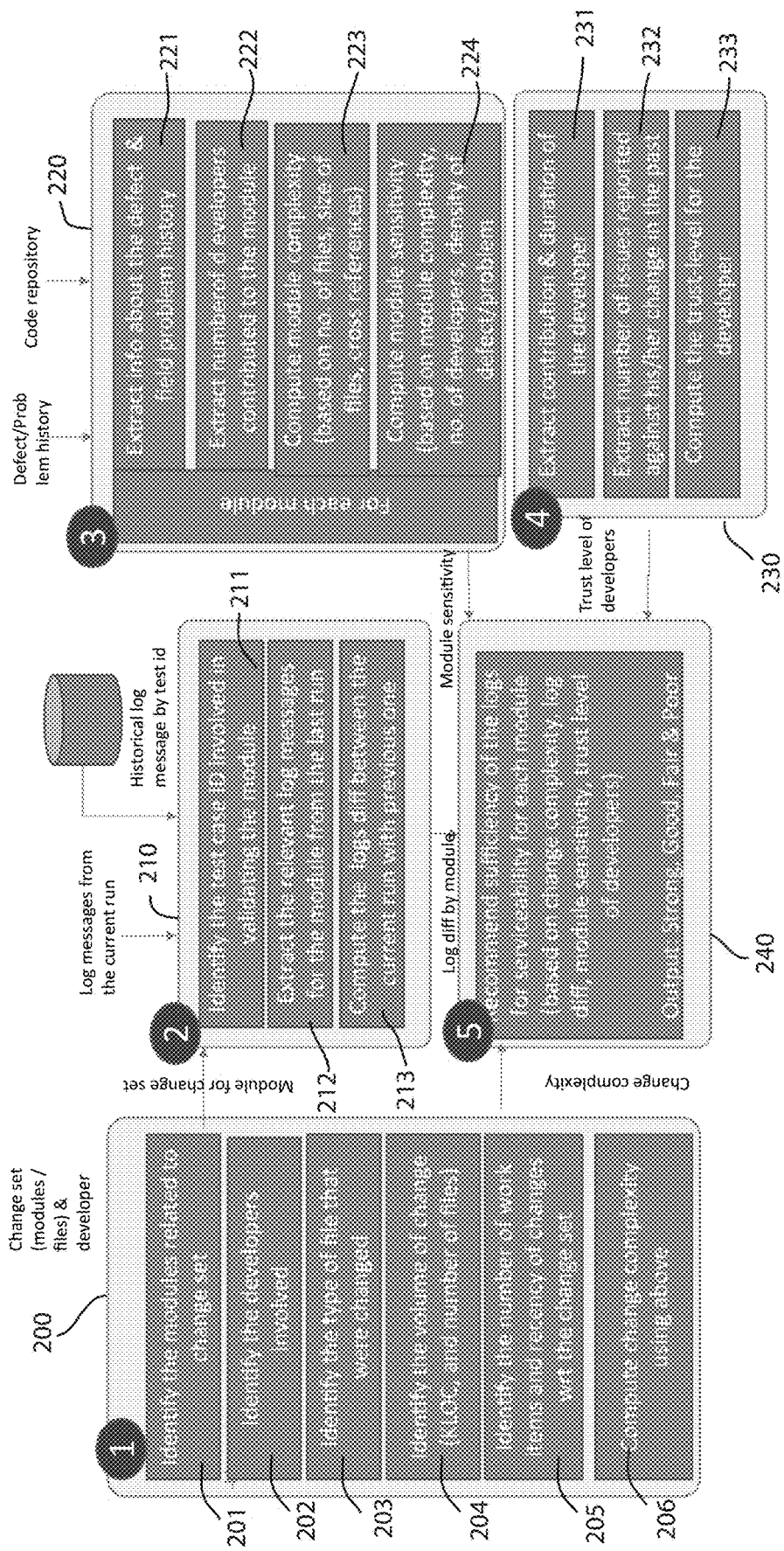
FIG. 3 depicts a flow chart diagram of several inputs used by the computing system, in accordance with embodiments of the present invention.

Embodiments of the complexity module 131 may include one or more components of hardware and/or software program code for calculating a complexity of the change set made to the continuous delivery pipeline. A change set may be a change, such as new code, entered into the continuous delivery pipeline to effectuate a change or addition to the SaaS application and/or infrastructure. Each change set may include a plurality of modules. The complexity module 131 may calculate, determine, analyze, etc. a complexity or a complexity value/level of the change set uploaded to the continuous delivery pipeline 110. FIG. 3 depicts a flow chart diagram of several inputs used by the computing system 120, in accordance with embodiments of the present invention. Embodiments of the complexity module 131 may calculate the complexity of the change set output 200 by implementing one or more of the following steps 201-06. At step 201, the complexity module 131 of the computing system 120 may identify the modules related to the change set. The change set may be transmitted to the computing system 120 from the continuous delivery pipeline. At step 202, the complexity module may identify the developers involved in the change set. For instance, the complexity module 131 may obtain an identity of a developer via a developer identification number associated with the change set. At step 203, the complexity module 131 may identify a type of file that was changed. Problems or defects related to certain types of files being changed are more difficult and complex to resolve, which can influence the overall complexity. At step 204, the complexity module 131 may identify a volume of change, such as KLOC and/or a number of filed being changed or affected by the change set. For example, the complexity module 131 may analyze the total number of lines of code included in the change set, as well as the number of separate files that have been affected to consider volume of a change within the change set. At step 205, the complexity module may identify a number of work items and a recency of changes with the change set. A more recent change may indicate that the solution to a potential defect may be more complex because an operations team may not yet have encountered the problem, or the change has to do with new features, which can add to the complexity. At step 206, the complexity module 131 may calculate the change complexity using the data/information gathered in steps 201-206. Each factor/data/information/input may be considered at equal weights or a weighting scheme may be applied to determine a complexity of the change set. The complexity output 200 may be a value, a number, a score, and the like, which may be used for later calculations by computing system 120 to determine a serviceability of the change set as well as used to dynamically configured a logging system, as described in greater detail infra.

Referring back to FIG. 1, embodiments of the computing system 120 may further include a comparing module 132. Embodiments of the comparing module 132 may include one or more components of hardware and/or software program for comparing a current log message created as a result of a test operation of the continuous delivery pipeline 110 during a current run with a previous log message created as a result of the test operation during a previous run, to determine a log difference between the current log message and the previous log message. For instance, a log difference may be the result of log message comparison from previous runs, wherein a greater log difference may indicate that new content is contained within the log messages, and a sufficiency of the log messages may be increased. A low or zero log difference may mean that no content has been added in the most current log message from the previous run, which could indicate that there is a lack of needed content in the current log message for SaaS operations to address any problems associated with the change set. Log messages may be created after a change set is tested at various points in the continuous delivery pipeline 110.

With reference again to FIG. 3, embodiments of the comparing module 132 may compare a current log message with a log message(s) from a previous run to determine a log difference output 210 by implementing one or more of the following steps 211-213. At step 211, the comparing module 132 may, as a result of the comparison, identify a test case identification of a particular test operation conducted within the continuous delivery pipeline 110, involved in validating the module. At step 212, the comparing module 132 may, as a result of the comparing, extract relevant log messages from the modules of the change set from a previous run (e.g. the last run). The data from the historical log messages may be retrieved or otherwise received from a database storing historical log messages, and may be sorted or retrievable by test identification number. At step 213, the comparing module 132 may compute the log difference output 210 using the information/data from steps 211-212.

With continued reference to FIGS. 1 and 3, embodiments of the computing system 120 may include a sensitivity module 133. Embodiments of the sensitivity module 133 may include one or more components of hardware and/or software program for determining a module sensitivity for each module of the change set. The module sensitivity may be calculated for each module of the change set, or a portion of modules of the change set determined to be the most relevant or important modules of the change set. Embodiments of the sensitivity module 133 of the computing system 120 may have access to a defect/problem history of the continuous delivery pipeline 110, as well as a repository storing code provided within the continuous delivery pipeline. Embodiments of the sensitivity module 133 may determine a module sensitivity output 220 by implementing one or more steps 221-224. At step 221, embodiments of the sensitivity module 133 may extract information about a defect and a field problem history. At step 222, the sensitivity module 133 may extract a number of developers that contributed to the module(s). At step 223, the sensitivity module 133 may determine, calculate, compute, or otherwise ascertain a module complexity for each module, which may be based on a number of files, a size of the files, cross-references, and the like. At step 224, the sensitivity module 133 may compute the module sensitivity output 220 using the information/data from steps 221-223.

Embodiments of the computing system 120 may also include a trust level module 134. Embodiments of the trust level module 134 may include one or more components of hardware and/or software program code for identifying a trust level of a developer of the change set. For instance, the trust level of the developer may influence a serviceability recommendation made by the computing system 120. Embodiments of the trust level module 134 may determine a developer trust level output 230 by implementing one or more steps 231-233. At step 231, embodiments of the trust level module 134 may extract a contribution of a developer and a duration or experience level of the developer associated with the change set. At step 232, the trust level module 134 may extract a number of issues reporting in the past against a particular developer. At step 223, the trust level module 134 may compute the developer trust level output 230 using the information/data from steps 231-232.

Figure 4:
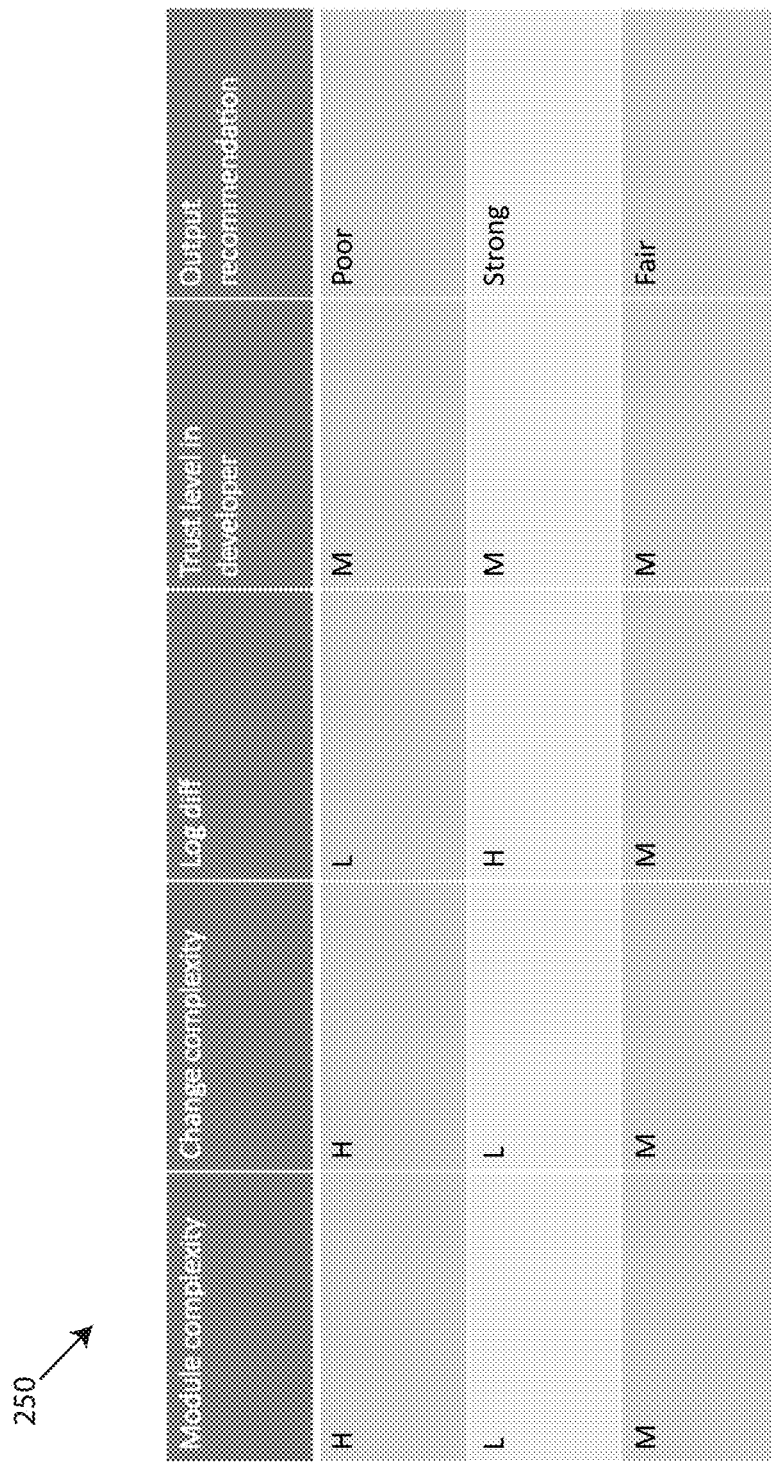
FIG. 4 depicts a log sufficiency recommendation table, in accordance with embodiments of the present invention.

Referring still to FIGS. 1 and 3, embodiments of the computing system 120 may include an analytics module 135. Embodiments of the analytics module 135 may include one or more components of hardware and/or software program for analyzing a serviceability of the change set made to the continuous delivery pipeline 110. The analytics module 135 may determine a serviceability (e.g. serviceability output 240) of the change set based on: (i) the complexity of the change set output 200, (ii) the log difference output 210, (iii) the module sensitivity output 220 of each module of the change set, and (iv) the trust level of the developer output 230. The outputs 200, 210, 220, 230 may be used by the analytics modules 135 to, as a function of the analyzing, determine a sufficiency of log messages for each module of the change set. If the analytics module 135 determines that a particular change set would result in insufficient log messages, then the analytics module 135 of the computing system 120 may reject, delete, remove, etc, or otherwise deal with the code associated with the change set within the continuous delivery pipeline 110. If the analytics module 135 of the computing system 120 determines that the change set would result in sufficient log messages, the analytics module 135 may accept the new code associated with the change set. Furthermore, the analytics module 135 may recommend a sufficiency of the log messages for serviceability for each module, based on the outputs 200, 210, 220, 230. FIG. 4 depicts a log sufficiency recommendation table 250, in accordance with embodiments of the present invention. The table 250 may include outputs from the computing system 120 regarding a serviceability of the change set. The table 250 may include the outputs 200, 210, 220, 230, and the output recommendation in columns, with various change sets in the row direction. For example, a first change set in a top row may have a high (H) module complexity, a high (H) change set complexity, a low (L) log difference, and a medium (M) trust level in the developer. Thus, the analytics module 120 of the computing system 120 may determine that the output recommendation of the serviceability of the first change set may be poor. In contrast, a second change set in the middle row may have a low (L) module complexity, a low (L) change set complexity, a low (H) log difference, and a medium (M) trust level in the developer. Thus, the analytics module 120 of the computing system 120 may determine that the output recommendation of the serviceability of the second change set may be strong. A third change set in the bottom row of table 250 may a have medium (M) module complexity, a medium (M) change set complexity, a medium (M) log difference, and a medium (M) trust level in the developer. Thus, the analytics module 120 of the computing system 120 may determine that the output recommendation of the serviceability of the third change set may be fair. The results in the table 250 may be configurable and manipulated by a member of a DevOps team.

Figure 5:
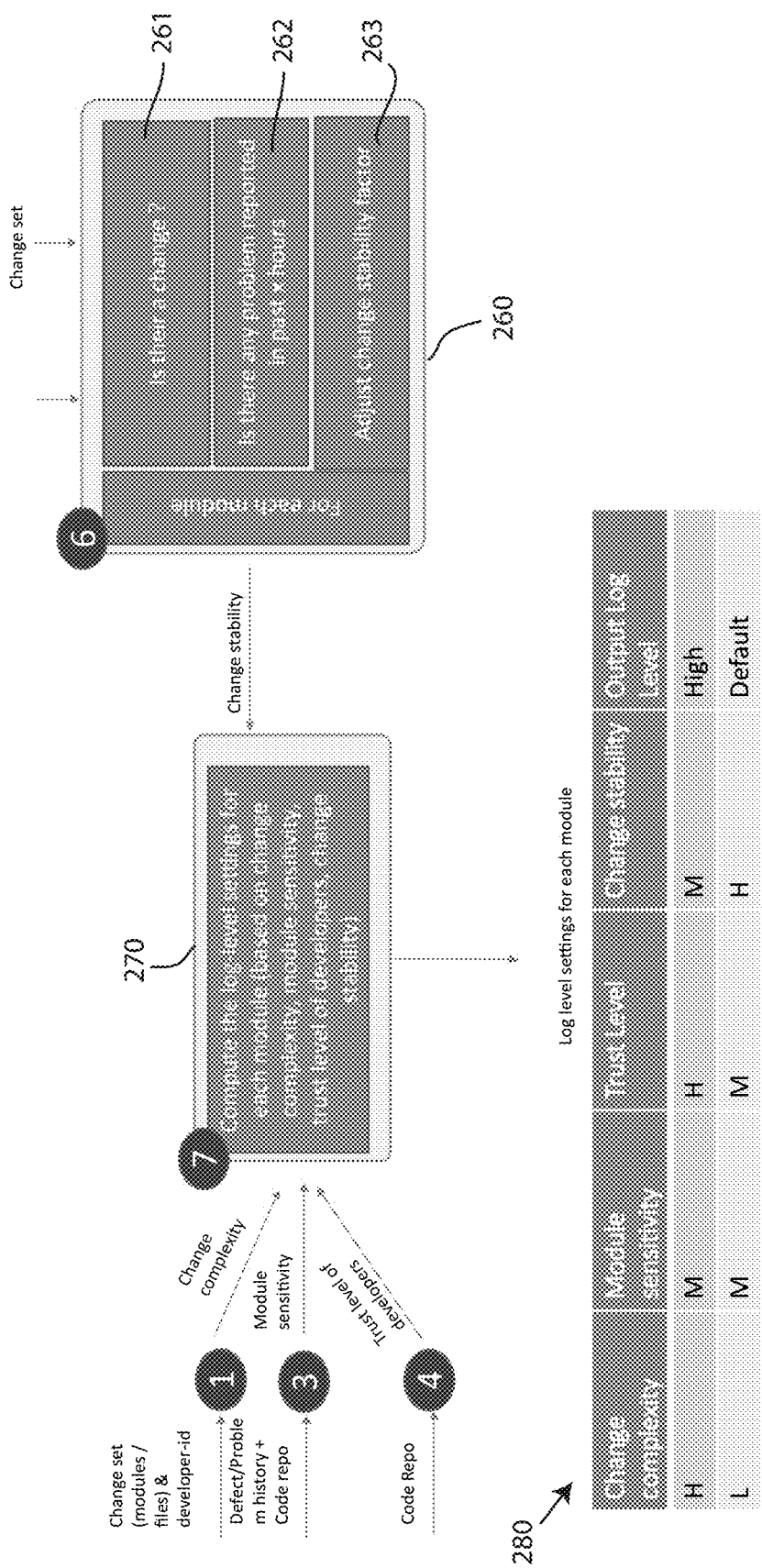
FIG. 5 depicts a flow diagram of a change stability factor used for computing log level settings, in accordance with embodiments of the present invention.
Figure 6:
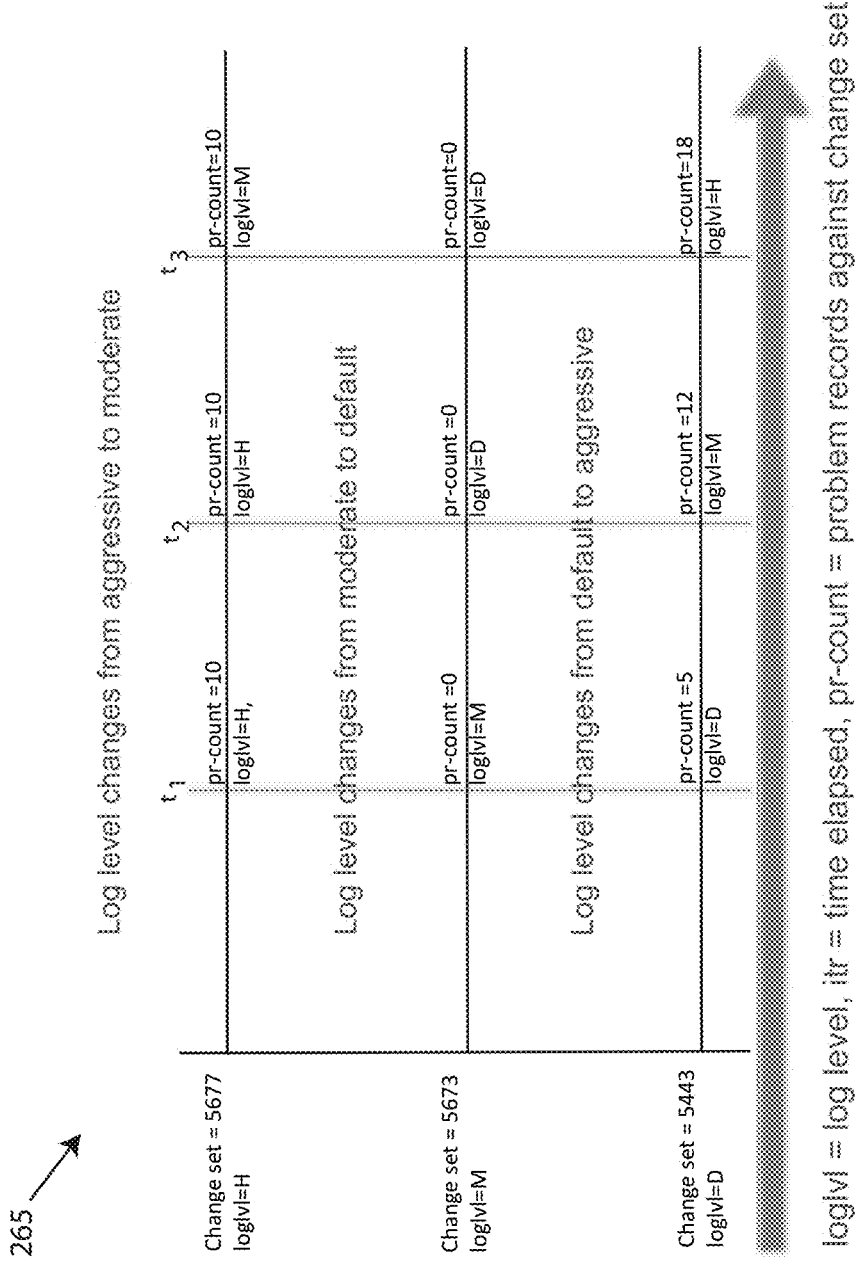
FIG. 6 depicts a graphical illustration of change stability calculated over time based on a number of problems occurring with the change set and an effect on an initial log level over time, in accordance with embodiments of the present invention.

Referring back to FIG. 1, embodiments of the computing system 120 may also include a tuning module 135. Embodiments of the tuning module 135 may include one or more components of hardware and/or software program code for determining a log level for each module of the change set. The tuning module 136 may determine a log level output 270. The determination of a log level output 270 may be based on outputs 200, 210, 220, 230, in particular, on (i) the complexity of the change set, (ii) the log difference, (iii) the module sensitivity of each module of the change set, and (iv) the trust level of the developer. FIG. 5 depicts a flow diagram of a change stability factor used for computing log level settings, in accordance with embodiments of the present invention. Embodiments of the tuning module 136 may also apply a stability factor 260 of the change set modules to assist in determining a configurable dynamic log level setting and tuning system. For example, the log level determination may be further based on a change stability factor 260, determined by implementing one or more steps 261-263. At step 261, the tuning module 136 of the computing system 120 may determine whether a change in a log level of a change set over time. At step 262, the tuning module 136 may determine whether any problems have been reported in a past 'x' amount of time (e.g. hours). At step 263, the tuning module 136 may determine the stability factor from the data/information obtained in steps 261-262. FIG. 6 depicts a graphical illustration 265 of change stability calculated over time based on a number of problems occurring with the change set and an effect on an initial log level over time, in accordance with embodiments of the present invention. Log levels may include high (H), which may record fatals, errors, warnings, info, and debug, medium (M), which may record fatals, errors, and warnings, and default (D), which may record errors. An example change set having an identification number "5677" may have an initial log level of high (H), and after a certain time, at t1, the log level remains at high (H), with 10 problem records (pr) against the change set, at t2, the log level remains high (H) with the same 10 problem records (pr) against the change set, and t3, the log level has been changed to medium (M) with 10 problem records (pr) against the change set. In this example, change set 5677 has log level changes from aggressive to moderate. In another example, change set having an identification number "5673" may have an initial log level of medium (M), and after a certain time, at t1, the log level remains at medium (H), with 0 problem records (pr) against the change set, at t2, the log level has changed to default (D) with zero problem records (pr) against the change set, and t3, the log level remains at default (D) with 00 problem records (pr) against the change set. In this example, change set 5673 has log level changes from moderate/medium to default. In yet another example in FIG. 6, change set having an identification number "5443" may have an initial log level of default (D), and after a certain time, at t1, the log level remains at default (H), with 5 problem records (pr) against the change set, at t2, the log level has changed to medium (M) now with 12 problem records (pr) against the change set, and t3, the log level has been changed to high (H) now with 18 problem records (pr) against the change set. In this example, change set 5443 has log level changes from default to aggressive.

Accordingly, a stability factor 260 may be calculated by the tuning module 136 for application to the log setting/tuning output 270, shown in FIG. 5. The output 270 may compute the log level setting for each module of the change set based on outputs 200, 210, 220, 230 as described above, as well as with the stability factor 260. The log level output 270 may be used by the computing system 120 to create log level table 280, which may display/indicate a log level setting for each module of the of the change set based on the outputs 200, 210, 220, 230, 240, 260. The table 280 shows a change complexity, a module sensitivity, trust level, a change stability, and an output log level in the columns of the table. A first change set in the top row may have a change complexity of high (H), a module sensitivity of medium/moderate (M), a trust level of high (H), and a change stability of moderate (M), and so the tuning module 136 of the computing system 120 may determine an output log level for the first change set to be high (H). A second change set in the bottom row of table 280 may have a change complexity of low (L), a module sensitivity of medium/moderate (M), a trust level of medium (M), and a change stability of high (H), and so the tuning module 136 of the computing system 120 may determine an output log level for the second change set to be default (D).

Furthermore, the log level for each module of the change set may be dynamically configured to return log messages of the continuous delivery pipeline for a specific log level. For instance, embodiments of the tuning module 136 of the computing system 120 may filter, configure, sort, generate, etc. the determined log levels in response to a request by a DevOps engineer to display a log level setting table, similar to table 280, but with only change sets in a specific, request log level. For example, a user may request to see change sets, and log messages thereof, for change sets having a high (H) log level. In this way, the user may be able to only see high log level change sets, which may record fatal, errors, warnings, debugs, and info. Therefore, embodiments of the computing system 120 may provide a dynamic configurable logging system associated with a SaaS environment.

Various tasks and specific functions of the modules of the computing system 120 may be performed by additional modules, or may be combined into other module(s) to reduce the number of modules. Further, embodiments of the computer or computer system 120 may comprise specialized, non-generic hardware and circuitry (i.e., specialized discrete non-generic analog, digital, and logic-based circuitry) (independently or in combination) particularized for executing only methods of the present invention. The specialized discrete non-generic analog, digital, and logic-based circuitry may include proprietary specially designed components (e.g., a specialized integrated circuit, such as for example an Application Specific Integrated Circuit (ASIC), designed for only implementing methods of the present invention). Moreover, embodiments of the adaptive log system 100 offers a technical improvement over the existing art using a method for providing feedback to developers of a sufficiency of log messages associated with a change set made to a continuous delivery pipeline in a SaaS environment. The technical improvement of the adaptive log system 100 improves software debugging, technical problem resolution in a continuous delivery pipeline that prior to the adaptive log system 100, was hindered by insufficient log message generation from the continuous delivery pipeline. Further, the adaptive log system 100 may be individualized to each change set and to each SaaS application/infrastructure.

Figure 7:
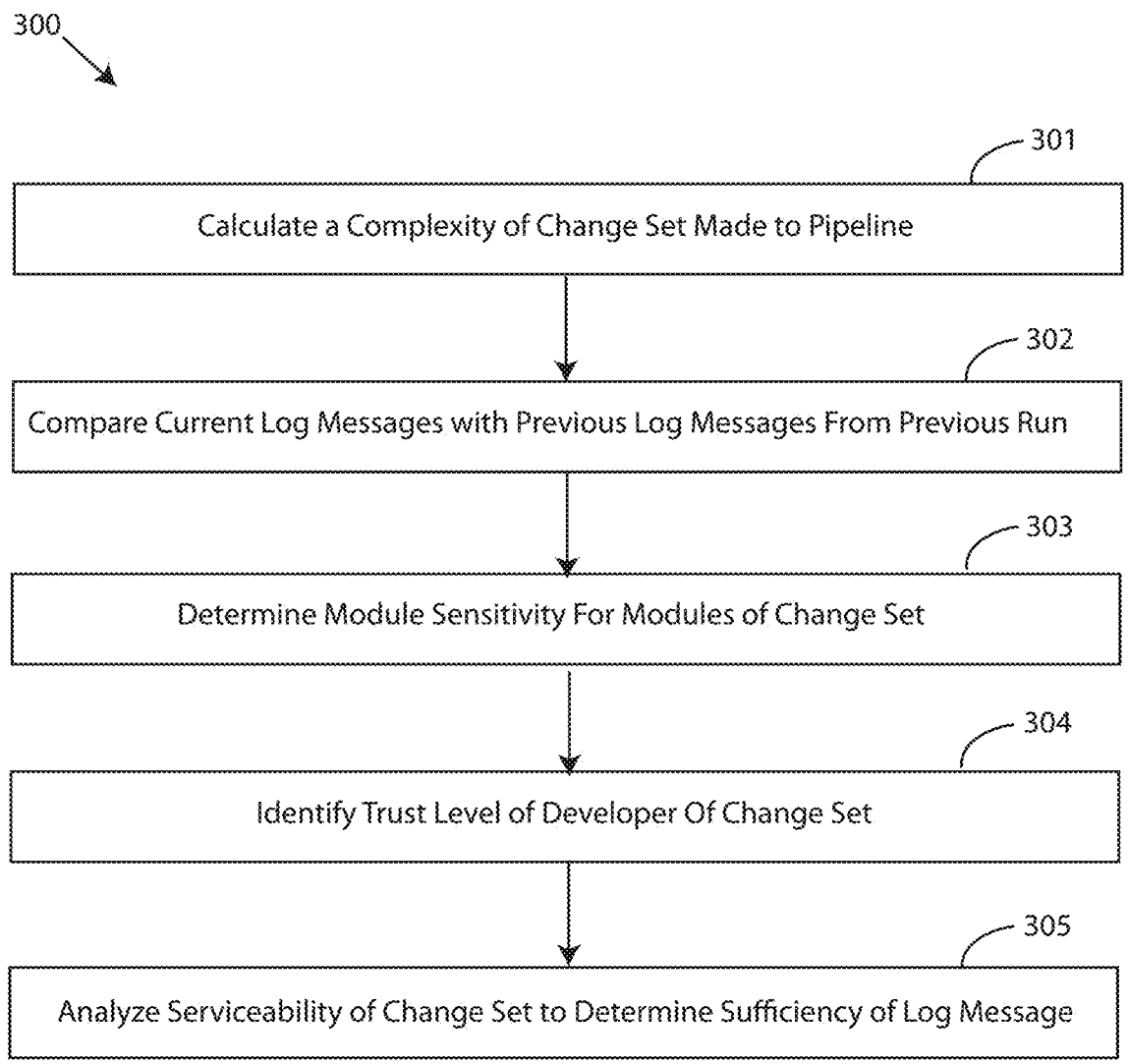
FIG. 7 depicts a flow chart of a method for providing feedback to developers of a sufficiency of log messages associated with a change set made to a continuous delivery pipeline in a SaaS environment, in accordance with embodiments of the present invention.

Referring now to FIG. 7, which depicts a flow chart of a method 300 for providing feedback to developers of a sufficiency of log messages associated with a change set made to a continuous delivery pipeline in a SaaS environment, in accordance with embodiments of the present invention. One embodiment of a method 300 or algorithm that may be implemented for providing feedback regarding a sufficiency of log messages associated with a change set made to a continuous delivery pipeline in a SaaS environment using the adaptive log system 100 described in FIGS. 1-6 using one or more computer systems as defined generically in FIG. 9 below, and more specifically by the specific embodiments of FIG. 1.

Embodiments of the method 300 for providing feedback to developers of a sufficiency of log messages associated with a change set made to a continuous delivery pipeline in a SaaS environment, in accordance with embodiments of the present invention, may begin at step 301 wherein a complexity of the change set made to a pipeline 110 is calculated. Step 302 compares a current log message with a previous log message from a previous run. Step 303 determines a module sensitivity for modules of the change set. Step 304 identifies a trust level of the developer associated with the change set. Step 305 analyzes a serviceability of the change set to determine a sufficiency of log messages, for providing feedback to DevOps.

Figure 8:
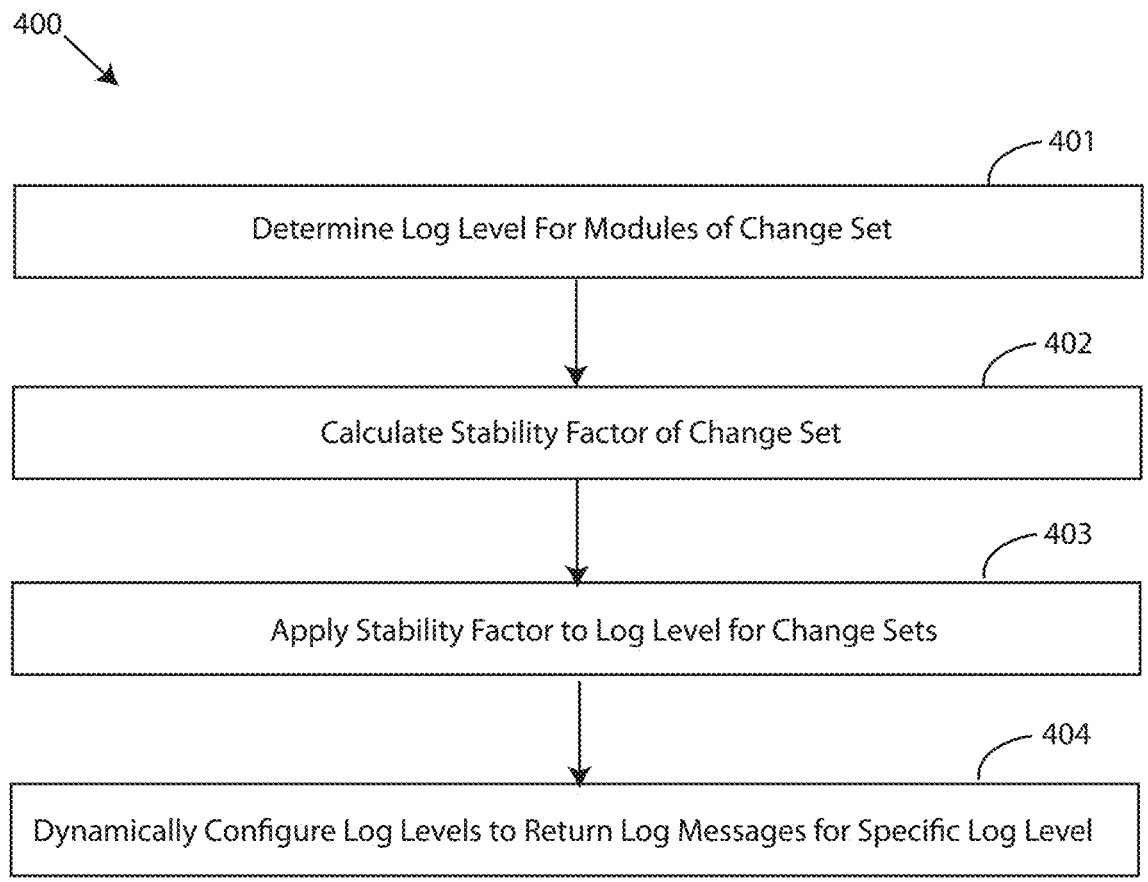
FIG. 8 depicts a flow chart of a method for dynamically configuring log levels, in accordance with embodiments of the present invention.

Referring now to FIG. 8, which depicts a flow chart of a method 400 for dynamically configuring log levels, in accordance with embodiments of the present invention. One embodiment of a method 400 or algorithm that may be implemented for dynamically configuring log levels using the adaptive log system 100 described in FIGS. 1-6 using one or more computer systems as defined generically in FIG. 9 below, and more specifically by the specific embodiments of FIG. 1.

Embodiments of the method 400 for dynamically configuring log levels, in accordance with embodiments of the present invention, may begin at step 401 wherein a log level is determined for modules of the change set. Step 402 calculates a stability factor of the change set. Step 403 applies the stability factor to log level output for change sets. Step 404 dynamically configures the log levels to return log messages for a specific log level.

Figure 9:
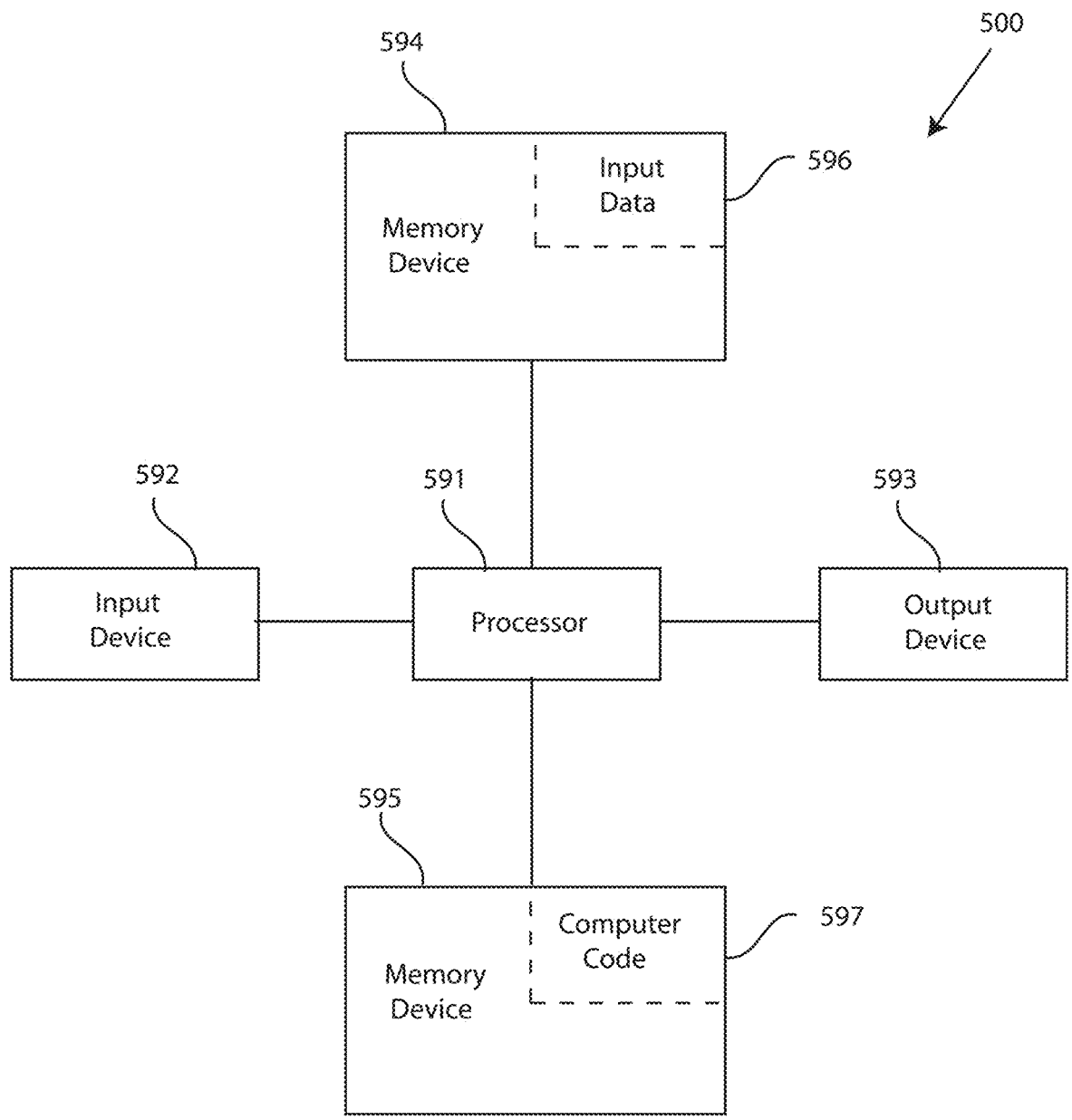
FIG. 9 depicts a block diagram of a computer system for the adaptive log system 100 of FIGS. 1-6, capable of implementing methods for providing feedback to developers of a sufficiency of log messages associated with a change set made to a continuous delivery pipeline in a SaaS environment of FIG. 7, and for dynamically configuring log levels in FIG. 8, in accordance with embodiments of the present invention.

FIG. 9 depicts a block diagram of a computer system for the adaptive log system 100 of FIGS. 1-6, capable of implementing methods for providing feedback to developers of a sufficiency of log messages associated with a change set made to a continuous delivery pipeline in a SaaS environment of FIG. 7, and for dynamically configuring log levels in FIG. 8, in accordance with embodiments of the present invention. The computer system 500 may generally comprise a processor 591, an input device 592 coupled to the processor 591, an output device 593 coupled to the processor 591, and memory devices 594 and 595 each coupled to the processor 591. The input device 592, output device 593 and memory devices 594, 595 may each be coupled to the processor 591 via a bus. Processor 591 may perform computations and control the functions of computer system 500, including executing instructions included in the computer code 597 for the tools and programs capable of implementing a method for providing feedback to developers of a sufficiency of log messages associated with a change set made to a continuous delivery pipeline in a SaaS environment, and for dynamically configuring log levels in the manner prescribed by the embodiments of FIGS. 7-8 using the adaptive log system 100 of FIGS. 1-6, wherein the instructions of the computer code 597 may be executed by processor 591 via memory device 595. The computer code 597 may include software or program instructions that may implement one or more algorithms for implementing the method for providing feedback to developers of a sufficiency of log messages associated with a change set made to a continuous delivery pipeline in a SaaS environment, and for dynamically configuring log levels, as described in detail above. The processor 591 executes the computer code 597. Processor 591 may include a single processing unit, or may be distributed across one or more processing units in one or more locations (e.g., on a client and server).

The memory device 594 may include input data 596. The input data 596 includes any inputs required by the computer code 597. The output device 593 displays output from the computer code 597. Either or both memory devices 594 and 595 may be used as a computer usable storage medium (or program storage device) having a computer-readable program embodied therein and/or having other data stored therein, wherein the computer-readable program comprises the computer code 597. Generally, a computer program product (or, alternatively, an article of manufacture) of the computer system 500 may comprise said computer usable storage medium (or said program storage device).

Memory devices 594, 595 include any known computer-readable storage medium, including those described in detail below. In one embodiment, cache memory elements of memory devices 594, 595 may provide temporary storage of at least some program code (e.g., computer code 597) in order to reduce the number of times code must be retrieved from bulk storage while instructions of the computer code 597 are executed. Moreover, similar to processor 591, memory devices 594, 595 may reside at a single physical location, including one or more types of data storage, or be distributed across a plurality of physical systems in various forms. Further, memory devices 594, 595 can include data distributed across, for example, a local area network (LAN) or a wide area network (WAN). Further, memory devices 594, 595 may include an operating system (not shown) and may include other systems not shown in FIG. 9.

In some embodiments, the computer system 500 may further be coupled to an Input/output (I/O) interface and a computer data storage unit. An I/O interface may include any system for exchanging information to or from an input device 592 or output device 593. The input device 592 may be, inter alia, a keyboard, a mouse, etc. or in some embodiments the touchscreen of a computing device. The output device 593 may be, inter alia, a printer, a plotter, a display device (such as a computer screen), a magnetic tape, a removable hard disk, a floppy disk, etc. The memory devices 594 and 595 may be, inter alia, a hard disk, a floppy disk, a magnetic tape, an optical storage such as a compact disc (CD) or a digital video disc (DVD), a dynamic random access memory (DRAM), a read-only memory (ROM), etc. The bus may provide a communication link between each of the components in computer 500, and may include any type of transmission link, including electrical, optical, wireless, etc.

An I/O interface may allow computer system 500 to store information (e.g., data or program instructions such as program code 597) on and retrieve the information from computer data storage unit (not shown). Computer data storage unit includes a known computer-readable storage medium, which is described below. In one embodiment, computer data storage unit may be a non-volatile data storage device, such as a magnetic disk drive (i.e., hard disk drive) or an optical disc drive (e.g., a CD-ROM drive which receives a CD-ROM disk). In other embodiments, the data storage unit may include a knowledge base or data repository 125 as shown in FIG. 1.

As will be appreciated by one skilled in the art, in a first embodiment, the present invention may be a method; in a second embodiment, the present invention may be a system; and in a third embodiment, the present invention may be a computer program product. Any of the components of the embodiments of the present invention can be deployed, managed, serviced, etc. by a service provider that offers to deploy or integrate computing infrastructure with respect to adaptive log message systems and methods. Thus, an embodiment of the present invention discloses a process for supporting computer infrastructure, where the process includes providing at least one support service for at least one of integrating, hosting, maintaining and deploying computer-readable code (e.g., program code 597) in a computer system (e.g., computer system 500) including one or more processor(s) 591, wherein the processor(s) carry out instructions contained in the computer code 597 causing the computer system to provide feedback to developers of a sufficiency of log messages associated with a change set made to a continuous delivery pipeline in a SaaS environment, and to dynamically configure log levels. Another embodiment discloses a process for supporting computer infrastructure, where the process includes integrating computer-readable program code into a computer system 500 including a processor.

The step of integrating includes storing the program code in a computer-readable storage device of the computer system 500 through use of the processor. The program code, upon being executed by the processor, implements a method for providing feedback to developers of a sufficiency of log messages associated with a change set made to a continuous delivery pipeline in a SaaS environment, and for dynamically configuring log levels. Thus, the present invention discloses a process for supporting, deploying and/or integrating computer infrastructure, integrating, hosting, maintaining, and deploying computer-readable code into the computer system 500, wherein the code in combination with the computer system 500 is capable of performing a method for providing feedback to developers of a sufficiency of log messages associated with a change set made to a continuous delivery pipeline in a SaaS environment, and for dynamically configuring log levels.

A computer program product of the present invention comprises one or more computer-readable hardware storage devices having computer-readable program code stored therein, said program code containing instructions executable by one or more processors of a computer system to implement the methods of the present invention.

A computer system of the present invention comprises one or more processors, one or more memories, and one or more computer-readable hardware storage devices, said one or more hardware storage devices containing program code executable by the one or more processors via the one or more memories to implement the methods of the present invention.

The present invention may be a system, a method, and/or a computer program product at any possible technical detail level of integration. The computer program product may include a computer-readable storage medium (or media) having computer-readable program instructions thereon for causing a processor to carry out aspects of the present invention.

The computer-readable storage medium can be a tangible device that can retain and store instructions for use by an instruction execution device. The computer-readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer-readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer-readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer-readable program instructions described herein can be downloaded to respective computing/processing devices from a computer-readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer-readable program instructions from the network and forwards the computer-readable program instructions for storage in a computer-readable storage medium within the respective computing/processing device.

Computer-readable program instructions for carrying out operations of the present invention may be assembler instructions, instruction-set-architecture (ISA) instructions, machine instructions, machine-dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer-readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer-readable program instructions by utilizing state information of the computer-readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer-readable program instructions.

These computer-readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer-readable program instructions may also be stored in a computer-readable storage medium that can direct a computer, a programmable data processing apparatus, and/or other devices to function in a particular manner, such that the computer-readable storage medium having instructions stored therein comprises an article of manufacture including instructions which implement aspects of the function/act specified in the flowchart and/or block diagram block or blocks.

The computer-readable program instructions may also be loaded onto a computer, other programmable data processing apparatus, or other device to cause a series of operational steps to be performed on the computer, other programmable apparatus or other device to produce a computer-implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 10:
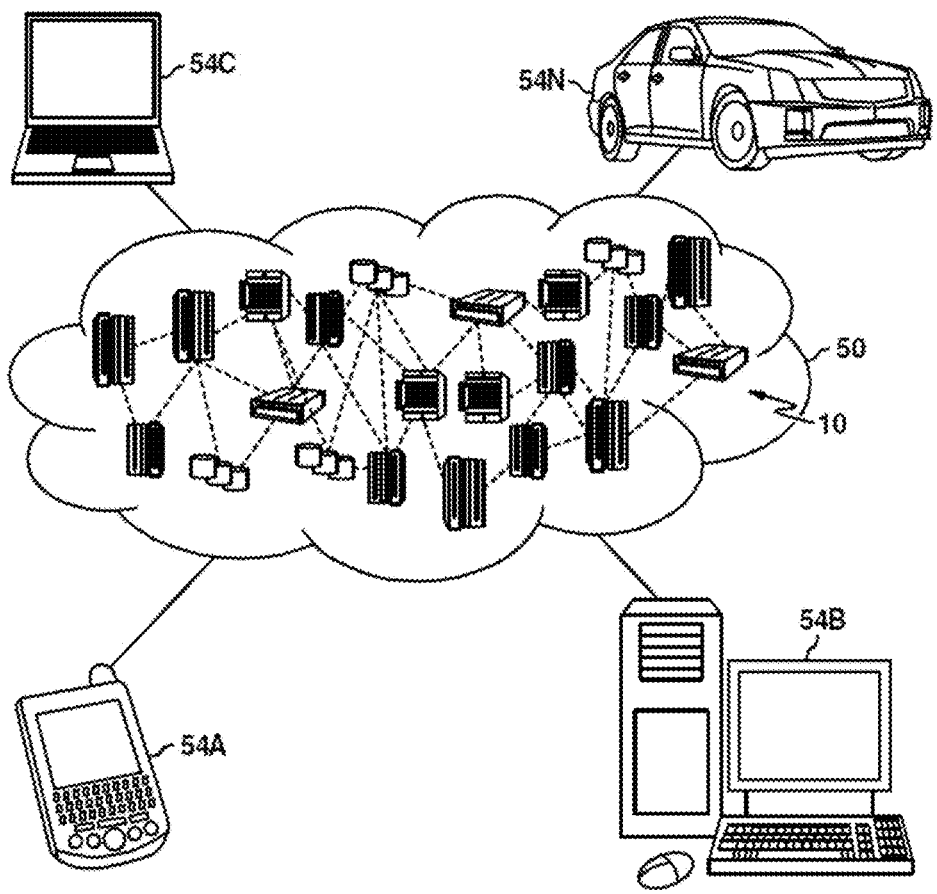
FIG. 10 depicts a cloud computing environment, in accordance with embodiments of the present invention.

Referring now to FIG. 10, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A, 54B, 54C and 54N shown in FIG. 7 are intended to be illustrative only and that computing nodes 10 and cloud computing environment 50 can communicate with any type of computerized device over any type of network and/or network addressable connection (e.g., using a web browser).

Figure 11:
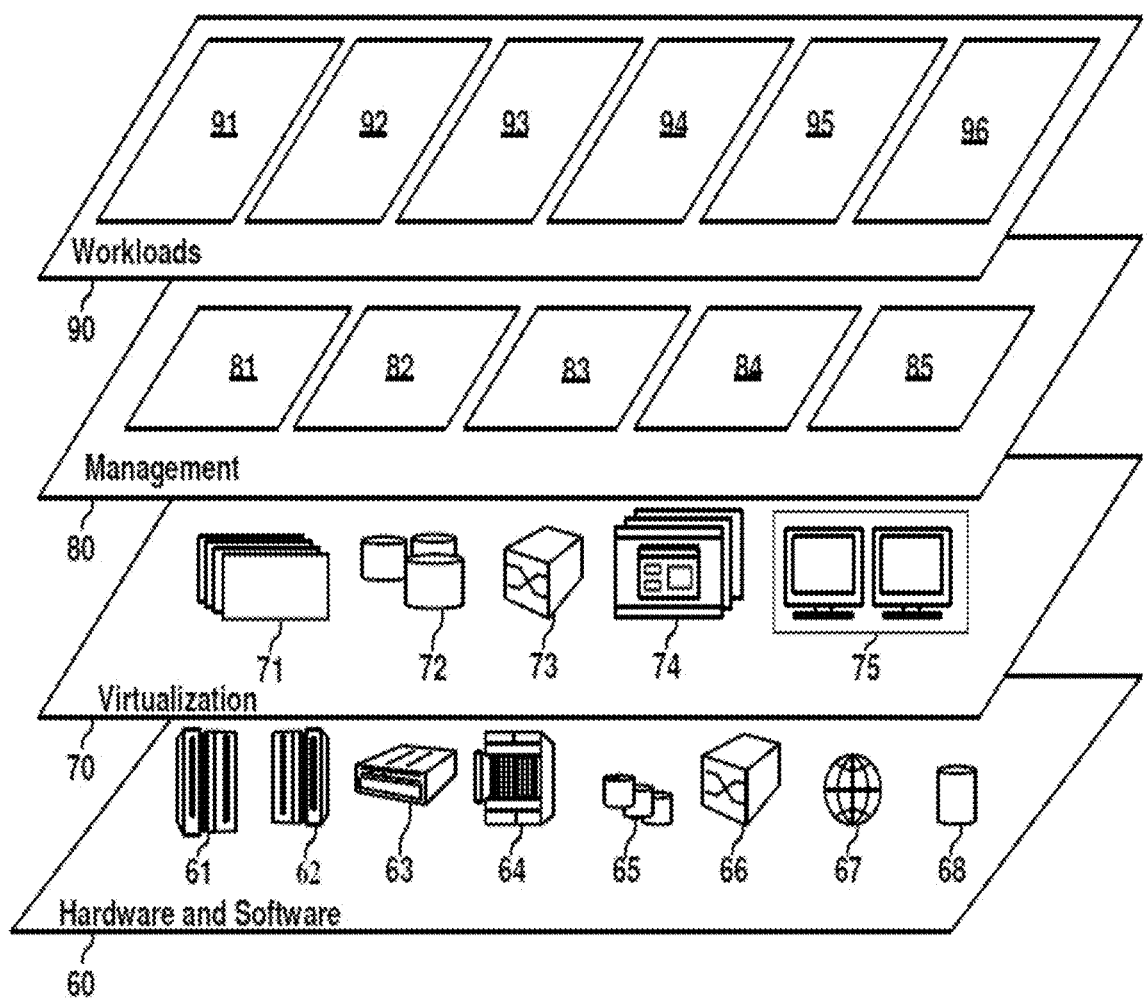
FIG. 11 depicts abstraction model layers, in accordance with embodiments of the present invention.

Referring now to FIG. 11, a set of functional abstraction layers provided by cloud computing environment 50 (see FIG. 10) are shown. It should be understood in advance that the components, layers, and functions shown in FIG. 11 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provides pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92, virtual classroom education delivery 93; data analytics processing 94; transaction processing 95; and adaptive log determination 96.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein

What is claimed is:

1. A method for providing feedback to developers of a sufficiency of log messages associated with a change set made to a continuous delivery pipeline in a Software as a Service (SaaS) environment, the method comprising:
   analyzing, by a processor of a computing system, a serviceability of the change set made to the continuous delivery pipeline in the SaaS environment based on a combination of: (i) a complexity of the change set, (ii) a log difference between a first log message and a second log message, (iii) a module sensitivity of each module of the change set, (iv) a stability of changes that were recently introduced in the change set, and (v) a trust level of a developer of the change set, wherein, as a function of the analyzing, the sufficiency of the log messages for each module of the change set is determined; and
   removing, by the processor of the computing system, the change set from the continuous delivery pipeline in the SaaS environment based on the sufficiency of the log messages for each module of the change set.

2. The method of claim 1, further comprising: determining, by the processor of the computing system, a log level for each module of the change set based on a combination of: (i) the complexity of the change set, (ii) the log difference between the first log message and the second log message, (iii) the module sensitivity of each module of the change set, and (iv) the trust level of the developer of the change set.

3. The method of claim 1, wherein a log level determination is further based on a change stability factor, and wherein the change stability factor is calculated over time based on a number of problems occurring with the change set and an effect on an initial log level over time.

4. The method of claim 3, wherein a log level for each module of the change set is dynamically configured to return log messages of the continuous delivery pipeline in the SaaS environment for a specific log level.

5. The method of claim 1, further comprising: calculating, by the processor of the computing system, the complexity of the change set made to the continuous delivery pipeline in the SaaS environment by identifying, by the processor of the computing system, modules related to the change set, a developer identification, a type of file that was changed, a kilo of lines of code (KLOC) of the change set, a number of files changed by the change set, a number of work items, and a recency of changes of the change set.

6. The method of claim 1, further comprising: identifying, by the processor of the computing system, the trust level of the developer of the change set including extracting a contribution of the developer of the change set, an experience level of the developer of the change set, and a number of issues reported against the developer of the change set.

7. The method of claim 1, further comprising: determining, by the processor of the computing system, the module sensitivity for each module of the change set including: (i) extracting, by the processor of the computing system, information about a defect and a field problem history, a number of developers that contributed to the module, and (ii) calculating, by the processor of the computing system, a module complexity based on a number of files affected by the change set, a size of the files affected by the change set, and a number of cross-references to the files affected by the change set.

8. A computer system, comprising:
   a processor;
   a memory device coupled to the processor; and a computer readable hardware storage device coupled to the processor, wherein the computer readable hardware storage device contains program code executable by the processor via the memory device to implement a method for providing feedback to developers of a sufficiency of log messages associated with a change set made to a continuous delivery pipeline in a Software as a Service (SaaS) environment, the method comprising:

analyzing, by the processor of the computer system, a serviceability of the change set made to the continuous delivery pipeline in the SaaS environment based on a combination of: (i) a complexity of the change set, (ii) a log difference between a first log message and a second log message, (iii) a module sensitivity of each module of the change set, fly) a stability of changes that were recently introduced in the change set, and (v) a trust level of a developer of the change set, wherein, as a function of the analyzing, the sufficiency of the log messages for each module of the change set is determined; and removing, by the processor of the computing system, the change set from the continuous delivery pipeline in the SaaS environment based on the sufficiency of the log messages for each module of the change set.

9. The computer system of claim 8, further comprising: determining, by the processor of the computer system, a log level for each module of the change set based on a combination of: (i) the complexity of the change set, (ii) the log difference between the first log message and the second log message, (iii) the module sensitivity of each module of the change set, and (iv) the trust level of the developer of the change set.

10. The computer system of claim 8, wherein a log level determination is further based on a change stability factor, and wherein the change stability factor is calculated over time based on a number of problems occurring with the change set and an effect on an initial log level over time.

11. The computer system of claim 10, wherein a log level for each module of the change set is dynamically configured to return log messages of the continuous delivery pipeline in the SaaS environment for a specific log level.

12. The computer system of claim 8, further comprising calculating, by the processor of the computer system, the complexity of the change set made to the continuous delivery pipeline in the SaaS environment by identifying, by the processor of the computer system, modules related to the change set, a developer identification, a type of file that was changed, a kilo of lines of code (KLOC) of the change set, a number of files changed by the change set, a number of work items, and a recency of changes of the change set.

13. The computer system of claim 8, further comprising: identifying, by the processor of the computer system, the trust level of the developer of the change set including extracting a contribution of the developer of the change set, an experience level of the developer of the change set, and a number of issues reported against the developer of the change set.

14. The computer system of claim 8, further comprising: determining, by the processor of the computer system, the module sensitivity for each module of the change set including: (i) extracting, by the processor of the computer system, information about a defect and a field problem history, a number of developers that contributed to the module, and (ii) calculating, by the processor of the computer system, a module complexity based on a number of files affected by the change set, a size of the files affected by the change set, and a number of cross-references to the files affected by the change set.

15. A computer program product comprising a computer readable hardware storage device storing computer readable program code, the computer readable program code comprising an algorithm that when executed by a processor of a computing system implements a method for providing feedback to developers of a sufficiency of log messages associated with a change set made to a continuous delivery pipeline in a Software as a Service (SaaS) environment, the method comprising:

analyzing, by a processor of a computing system, a serviceability of the change set made to the continuous delivery pipeline in the SaaS environment based on a combination of: (i) a complexity of the change set, (ii) a log difference between a first log message and a second log message, (iii) a module sensitivity of each module of the change set, civ) a stability of changes that were recently introduced in the change set, and (v) a trust level of a developer of the change set, wherein, as a function of the analyzing, the sufficiency of the log messages for each module of the change set is determined; and removing, by the processor of the computing system, the change set from the continuous delivery pipeline in the SaaS environment based on the sufficiency of the log messages for each module of the change set.

16. The computer program product of claim 15, further comprising: determining, by the processor of the computing system, a log level for each module of the change set based on a combination of: (i) the complexity of the change set, (ii) the log difference between the first log message and the second log message, (iii) the module sensitivity of each module of the change set, and (iv) the trust level of the developer of the change set.

17. The computer program product of claim 15, wherein a log level determination is further based on a change stability factor, wherein the change stability factor is calculated over time based on a number of problems occurring with the change set and an effect on an initial log level over time, and wherein a log level for each module of the change set is dynamically configured to return log messages of the continuous delivery pipeline in the SaaS environment for a specific log level.

18. The computer program product of claim 15, further comprising calculating, by the processor of the computing system, the complexity of the change set made to the continuous delivery pipeline in the SaaS environment by identifying, by the processor of the computing system, modules related to the change set, a developer identification, a type of file that was changed, a kilo of lines of code (KLOC) of the change set, a number of files changed by the change set, a number of work items, and a recency of changes of the change set.

19. The computer program product of claim 15, further comprising: identifying, by the processor of the computing system, the trust level of the developer of the change set including extracting a contribution of the developer of the change set, an experience level of the developer of the change set, and a number of issues reported against the developer of the change set.

20. The computer program product of claim 15, further comprising: determining, by the processor of the computing system, the module sensitivity for each module of the change set including: (i) extracting, by the processor of the computing system, information about a defect and a field problem history, a number of developers that contributed to the module, and (ii) calculating, by the processor of the computing system, a module complexity based on a number of files affected by the change set, a size of the files affected by the change set, and a number of cross-references to the files affected by the change set.

* * * * *